W. MILLER.
Self-Levelling Berth.

No. 228,100. Patented May 25, 1880.

Witnesses.
E. F. Fairchild
Geo. W. Pierce.

Inventor
W. Miller
by Wright & Brown
Attys.

N. PETERS, PHOTO-LITHOGRAPHER, WASHINGTON, D.C.

UNITED STATES PATENT OFFICE.

WILLIAM MILLER, OF BOSTON, MASSACHUSETTS, ASSIGNOR TO HIMSELF AND GEORGE M. MILLER, OF SAME PLACE.

SELF-LEVELING BERTH.

SPECIFICATION forming part of Letters Patent No. 228,100, dated May 25, 1880.

Application filed February 28, 1880.

*To all whom it may concern:*

Be it known that I, WILLIAM MILLER, of Boston, in the county of Suffolk and State of Massachusetts, have invented certain Improvements in Self-Leveling Berths, of which the following is a specification.

This invention has for its object to provide improved means for supporting a vessel's berth and permitting the same to oscillate so as to remain comparatively level at all times.

The invention consists, mainly, in a bail or bent bar, to which the ends of the berth are pivoted, said bar being pivoted to a bracket over the center of the berth, so as to have a universal movement. A spring is provided to partially check the vertical oscillations of the bar, and the ends of the bar are provided with guides, which prevent any extreme lateral oscillations of the bar, all of which I will now proceed to describe.

Figure 1:
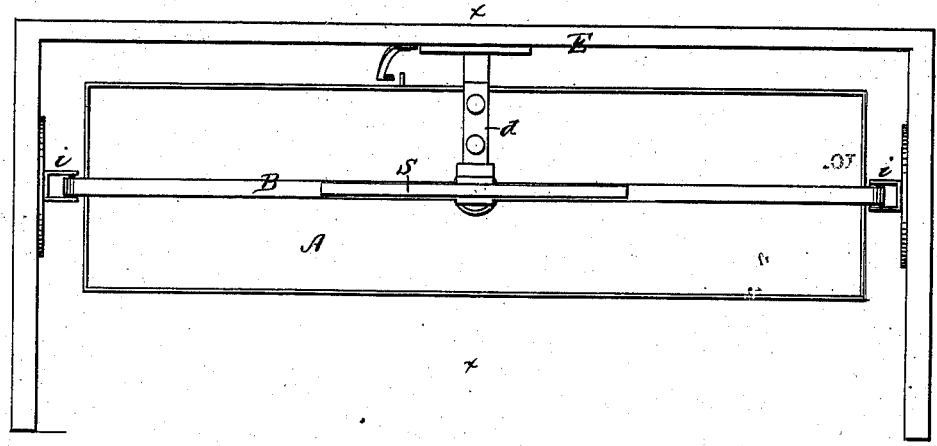
Figure 2:
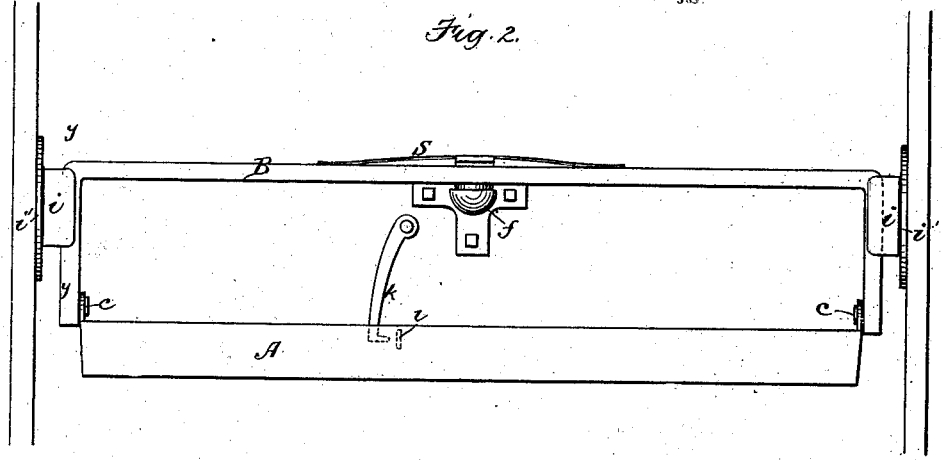
Figure 3:
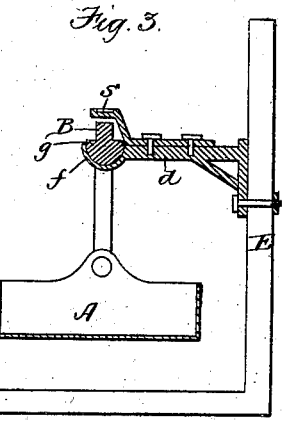
Figure 4:
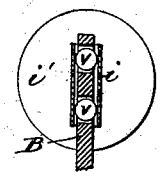

Of the accompanying drawings, forming a part of this specification, Figure 1 represents a top view of a berth and its casing embodying my invention. Fig. 2 represents a side view of the same. Fig. 3 represents a section on line $x\,x$, Fig. 1. Fig. 4 represents a section on line $y\,y$, Fig. 2.

The same letters indicate the same parts in all the figures.

In the drawings, A represents a vessel's berth of any suitable construction. B represents a stout bail or bent bar, of any suitable material, having two ends, which are bent substantially at right angles with its main portion.

The ends of the berth are pivoted to the bent ends of the bar at $c\,c$, so as to be capable of rocking or oscillating laterally, and the bar is supported by a bracket, $d$, attached to the casing E and projecting over the center of the berth.

The bar and bracket are connected by a universal joint, so that the bar can oscillate in any direction. This joint is preferably composed of a hemispherical socket, $f$, formed on the bracket, and a hemisphere, $g$, formed on the under side of the bar, and of the proper size to fit and turn freely in the socket.

$i\,i$ represent guides attached to the ends of the casing. Each guide consists of a plate having two flanges arranged to receive between them one of the ends of the bar B. Each guide is preferably pivoted to a plate, $i'$, on the end of the casing, so as to be capable of a slight oscillating motion, which permits the bar B to have a limited lateral oscillation, the purpose of the guides being to prevent any such lateral oscillation of the bar as would cause the berth to vibrate laterally like a pendulum in an arc of which the socket $f$ is the center. The guides also prevent the bar from turning horizontally, but do not interfere with the longitudinal oscillations of the bar and berth.

S represents a spring, which is secured to the bracket $d$, and bears downwardly upon the upper surface of the bar B at each side of the bracket. This spring is intended to partially check the vertical oscillations of the bar B and prevent it from oscillating too freely.

It will be seen that the berth is poised or suspended so as to maintain a level position under almost all circumstances.

The pivoting of the berth to the bar B enables it to oscillate laterally on its own pivots in a direction at right angles to the direction of oscillation of the bar when the vessel rocks laterally, and the bar B, pivoted to oscillate in any direction, keeps the berth level longitudinally.

The bent ends of the bar B are preferably provided with friction-rollers $v$, which run against the sides of the guides.

When it is desirable to entirely prevent the oscillations of the berth it may be made fast by a hook, $k$, on the casing engaging a staple, $l$, on the side of the berth.

The bracket $d$ may be attached to the side of the casing, as shown, or may be formed to be attached to a ceiling over the berth.

I claim—

1. The combination of the fixed socket $f$, the bail B, supported by the socket and adapted to oscillate longitudinally, fixed guides $i\,i$, whereby the bail is prevented from oscillating laterally and swinging horizontally, and the berth A, pivoted to the ends of the bail in such manner as to oscillate laterally or at right angles to the direction of oscillation of the bail, as set forth.

2. The combination of the bail B, the bracket d, and the spring S, secured to the bracket and arranged to bear upon the bail at opposite sides of the bracket, as set forth.

In testimony whereof I have signed my name to this specification, in the presence of two subscribing witnesses, this 25th day of February, A. D. 1880.

WILLIAM MILLER.

Witnesses:
 C. F. BROWN,
 RICHARD BROWN.